United States Patent
Fuller et al.

(10) Patent No.: US 9,260,542 B2
(45) Date of Patent: Feb. 16, 2016

(54) PARTLY FLUORINATED POLYOLEFINS BY ZIEGLER-NATTA POLYMERIZATION

(75) Inventors: Timothy J. Fuller, Pittsford, NY (US); Lijun Zou, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 5 days.

(21) Appl. No.: 13/438,379

(22) Filed: Apr. 3, 2012

(65) Prior Publication Data

US 2013/0260287 A1  Oct. 3, 2013

(51) Int. Cl.
*C08F 214/18* (2006.01)
*C08F 214/26* (2006.01)
*C08F 2/00* (2006.01)
(Continued)

(52) U.S. Cl.
CPC .............. *C08F 14/18* (2013.01); *C08L 2314/02* (2013.01); *H01M 8/0271* (2013.01); *H01M 8/0284* (2013.01); *H01M 8/24* (2013.01)

(58) Field of Classification Search
CPC .......... C01F 12/20; C08F 12/20; C08F 16/24; C08F 116/12; C08F 216/12; C08F 214/18; C08F 2114/18; C08F 14/18; C08F 114/18; C08F 4/60; C08F 30/04; C08F 210/00; C08F 230/08; C08F 14/22; C08F 4/022
USPC ........... 526/169.3, 124.1–238, 169–179, 943; 526/242–255, 141, 88; 429/185, 535; 428/36.9
See application file for complete search history.

(56) References Cited

U.S. PATENT DOCUMENTS 3,287,339 A * 11/1966 Sianesi et al. ................. 526/141
3,804,817 A    4/1974 Wall et al.
(Continued)

FOREIGN PATENT DOCUMENTS

CN   1093093 A   10/1994
CN   1384124 A   12/2002
(Continued)

OTHER PUBLICATIONS

Bernett, M.K., "Surface Chemical Properties of Highly Fluorinated Ethylenic Polymers", Properties of fluorinated Ethylenic Polymers, v. 7, n. 6, Nov.-Dec. 1974, pp. 917-920.
(Continued)

*Primary Examiner* — Patrick Ryan
*Assistant Examiner* — Kiran Quraishi
(74) *Attorney, Agent, or Firm* — Brooks Kushman P.C.

(57) ABSTRACT

A method of forming a polymer includes a step of polymerizing a compound having formula 1 with a Ziegler-Natta catalyst to form a polymer having formula 2:

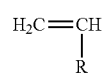

(1)

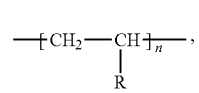

(2)

wherein:
R is a fluorinated $C_{1-18}$ alkyl group, a fluorinated ether group, or a fluorinated silane ether; and
n is a number from about 20 to 500 on average.

11 Claims, 2 Drawing Sheets

(51) Int. Cl.
*C08F 14/18* (2006.01)
*H01M 8/24* (2006.01)
*H01M 8/02* (2006.01)

(56) References Cited

U.S. PATENT DOCUMENTS

| | | | |
|---|---|---|---|
| 6,265,507 B1 * | 7/2001 | Wang | C08F 210/00 |
| | | | 526/206 |
| 2006/0073385 A1 * | 4/2006 | Andrin et al. | 429/185 |
| 2009/0239123 A1 * | 9/2009 | Kotera | H01M 8/1018 |
| | | | 429/530 |
| 2010/0324233 A1 * | 12/2010 | Matthews et al. | 526/88 |
| 2011/0111156 A1 * | 5/2011 | Durali et al. | 428/36.9 |
| 2011/0281195 A1 | 11/2011 | Fuller et al. | |

FOREIGN PATENT DOCUMENTS

| | | |
|---|---|---|
| CN | 101909736 A | 12/2010 |
| WO | 2009/088428 A1 | 7/2009 |
| WO | WO 2010005755 A1 * | 1/2010 ............ C08F 214/22 |

OTHER PUBLICATIONS

Brown, D.W. et al., "Radiation Induced Polymerization of Propylene at High Pressure," National Bureau of Standards, Washington, D.C. received Sep. 22, 1962, vol. 67, pp. 1016-1019.

Hu, William K. H. et al., "Critical Surface Tensions of Radiation-Induced Polymers and Copolymers of Tetrafluoroethylene with Fluorinated Propenes or Pentenes," Macromolecules, v. 4, n. 6, Nov.-Dec. 1971, pp. 688-691.

* cited by examiner

PARTLY FLUORINATED POLYOLEFINS BY ZIEGLER-NATTA POLYMERIZATION

FIELD OF THE INVENTION

The present invention relates to methods for making polymers that are useful for fuel cell components, gas barriers, sealants, and the like.

BACKGROUND OF THE INVENTION

Polymeric materials are used in countless applications including, but not limited to, fuel cell components, battery components, adhesives, gas barrier, and the like. Polymeric materials have been used in many fuel cell components such as the ion conducting membrane, the catalyst layers, the gas diffuse layers, adhesives that bind individual fuel cells in a stack, and gaskets.

In proton exchange membrane (PEM) type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL"). A sealing gasket is usual provided along the edges between the MEA and the GDL. The MEA/GDL assembly is sandwiched between a pair of non-porous, electrically conductive elements or plates with a sealing gasket along the edges. Typically, the sealing gaskets used in a fuel cell are polymeric with polyolefins being particularly useful. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

Ziegler-Natta catalysts are a class of catalysts that have been utilized for making poly($\alpha$-olefins). Although these catalysts work reasonably well for forming non-fluorinated polyolefins, these catalysts have not been successfully used for forming perfluorinated polymers.

Accordingly, there is a need for improved methods for forming fuel cell membranes, diffusion media, fuel cell electrodes and battery separators.

SUMMARY OF THE INVENTION

The present invention solves one or more problems of the prior art by providing in at least one embodiment a method of forming a polymer. The method comprising polymerizing a compound having formula 1 with a Ziegler-Natta catalyst to form a polymer having formula 2:

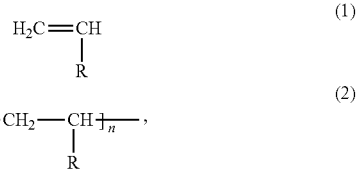

wherein:

R is a fluorinated $C_{1-18}$ alkyl group, a fluorinated ether group, or a fluorinated silane ether; and n is a number from about 20 to 500 on average.

In another embodiment, a method of forming a polymer is provided. The method includes a step of polymerizing a compound having formula 1 with a Ziegler-Natta catalyst to form a polymer having formula 2:

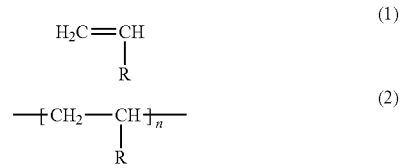

wherein:

R is $CF_3$, $CF_2CF_3$, $CF_2CF_2Br$, $(CF_2)_6F$, $C_{12}F_{25}$, $CH_2OCH_2(CF_2)CF_3$, $CH_2OCH_2(CF_2)_4H$, $CH_2OCH_2C_7F_{15}$, $CH_2OCF_2CHFCF_3$, $CH_2C(CF_3)_2O$—$SiMe_3$, $CH_2C_6F_6$, $CH_2OCH_2CF_2CF_2H$, or $CH_2OCF_2CF_2SO_2F$; and n is a number from about 20 to 500 on average. Characteristically, the Ziegler-Natta catalyst includes titanium chloride and a dialkyl aluminum.

In another embodiment, a method of forming a fuel cell component is provided. The method includes a step of polymerizing a compound having formula 1 with a Ziegler-Natta catalyst to form a polymer having formula 2:

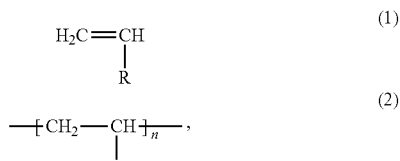

wherein:

R is $CF_3$, $CF_2CF_3$, $CF_2CF_2Br$, $(CF_2)_6F$, $C_{12}F_{25}$, $CH_2OCH_2(CF_2)CF_3$, $CH_2OCH_2(CF_2)_4H$, $CH_2OCH_2C_7F_{15}$, $CH_2OCF_2CHFCF_3$, $CH_2C(CF_3)_2O$—$SiMe_3$, $CH_2C_6F_6$, $CH_2OCH_2CF_2CF_2H$, or $CH_2OCF_2CF_2SO_2F$; and n is a number from about 20 to 500 on average. Characteristically, the Ziegler-Natta catalyst includes titanium chloride and a dialkyl aluminum with the titanium chloride being titanium trichloride or titanium tetrachloride. The polymer having formula 2 is then incorporated into a fuel cell component.

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1:
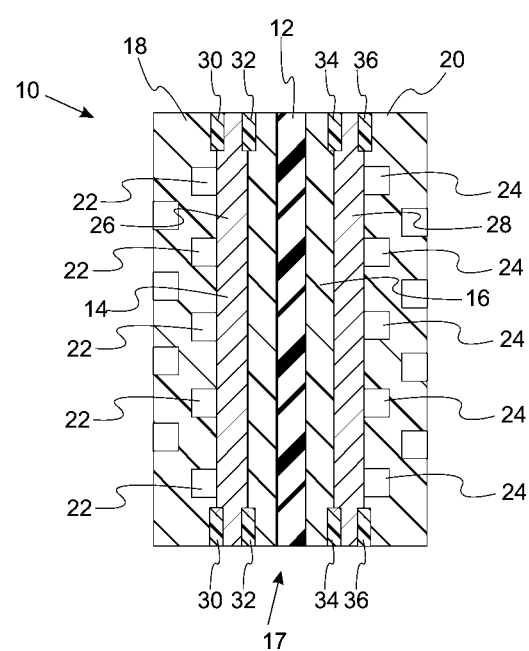
FIG. 1 provides a schematic cross section of a fuel cell incorporating the polymers of various embodiments.

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 2:
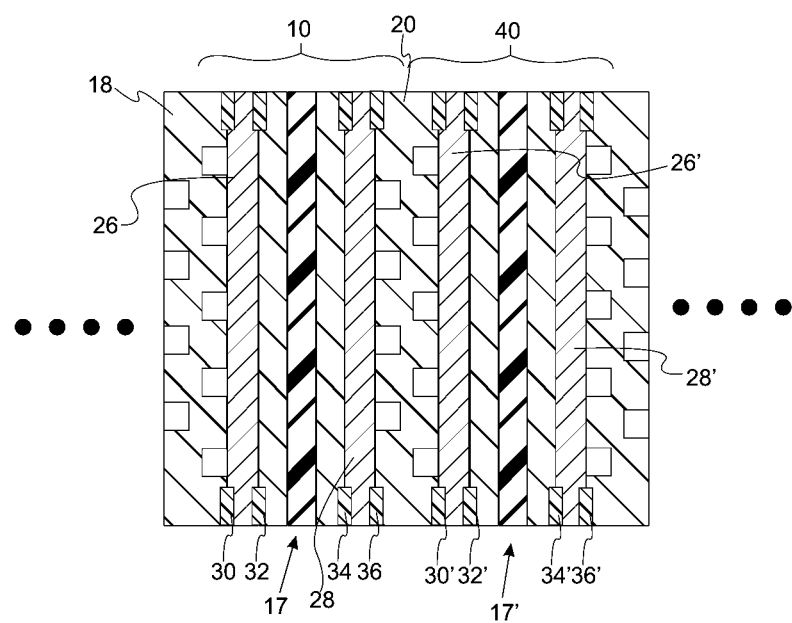
FIG. 2 provides a schematic cross section of two fuel cells in a fuel cell stack each of which is of the general design of FIG. 1.

In at least one aspect, the present invention provides methods of making polymers from an olefin using a Ziegle-Natta catalyst. The polymers are useful in a number of applications such as adhesives/seals in fuel cells, gas barrier layers, as Kynar™ substitutes in fuel cells, piezoelectrics, and the like. FIG. 1 provides a schematic cross section of a fuel cell incorporating the polymers of various embodiments. Fuel cell 10 includes polymeric ion conducting membrane 12 disposed between anode catalyst layer 14 and cathode catalyst layer 16 to form proton exchange membrane 17. Anode catalyst layer 14 and cathode catalyst layer 16 each typically include a supported precious metal (e.g., Pt, Pd, etc.) catalyst. Carbon particles are a typical support material. In a refinement, ion conducting membrane 12 includes the polymers formed by the methods set forth below. Fuel cell 10 also includes bipolar electrically conductive plates 18 and 20, gas channels 22 and 24, and gas diffusion layers 26 and 28. During operation hydrogen is usually fed to the fuel cell through channels 22 and an oxidant (e.g., oxygen) through channels 24. Fuel cell 10 also includes seals 30-36 interposed between the fuel cell components indicated in FIG. 1. Seals 30-36 are along all four edges of the periphery of fuel cell 10. For example, seal 30 is interposed between bipolar electrically conductive plates 18 and gas diffusion layer 26, seal 32 is interposed between gas diffusion layer 26 and anode catalyst layer 14, etc. In a refinement, seals 30-36 are each independently gaskets that include the polymers formed by the methods set forth below. FIG. 2 provides a schematic cross section of two fuel cells in a fuel cell stack. Each fuel cell 10 and 40 of FIG. 2 are of the general design of FIG. 1. The components of fuel cell 40 are indicated with an apostrophe. FIG. 2 illustrates the use of seals 30-36 and 30'-36' in a fuel cell stack.

In an embodiment of the present invention, a method of making a polymer is provided. The method includes a step of polymerizing a compound (e.g., an olefin) having formula 1 with a Ziegler-Natta catalyst to form a polymer having formula 2:

(1)

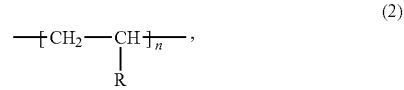

(2)

wherein:

R is a fluorinated $C_{1-18}$ alkyl group, a fluorinated ether group, or a fluorinated silanol ether; and n is a number from about 20 to 500 on average. In general, R is partially or fully fluorinated. In a variation of the present embodiment, R is $CF_3$, $CF_2CF_3$, $CF_2CF_2Br$, $(CF_2)_6F$, $C_{12}F_{25}$, $CH_2OCH_2(CF_2)CF_3$, $CH_2OCH_2(CF_2)_4H$, $CH_2OCH_2C_7F_{15}$, $CH_2OCF_2CHFCF_3$, $CH_2C(CF_3)_2O-SiMe_3$, $CH_2C_6F_6$, $CH_2OCH_2CF_2CF_2H$, or $CH_2OCF_2CF_2SO_2F$.

Examples of olefins having formula 1 include, but are not limited to, allyloxy-1,1,2,2-tetrafluoroethanesulfonyl fluoride, 4-bromo-3,3,4,4-tetrafluoro-1-butene, 3,3,4,4-pentafluoro-1-butene, pentafluoroethyltrifluoro-vinyl ether, hexafluoro-1,3-butadiene, 3,3,3-trifluoropropene, 2,3,3,3-tetrafluoropropene, hexafluoroisobutylene, 1,1,3,3,3-pentafluoropropane, hexafluoropropyltrifluorovinyl ether, propene, butane, perfluorocyclopentene, 4-phenyl-1-butene, 1'-phenyl-1-undecene, and K+ allyloxy-1,1,2,2-tetrafluoroethanesulfonate.

In another variation of the present embodiment, the method further includes incorporating the polymer having formula 2 into a fuel cell component. In a refinement, the fuel cell component is an adhesive layer between fuel cells in a fuel cell stack. In another variation, the method further includes incorporating the polymer having formula 2 into a gas barrier. In another variation, the method further includes incorporating the polymer having formula 2 into a piezoelectric device. In this context "incorporating the polymer" means forming a part (i.e., a gasket, a film, or a polymeric structure) from the polymer.

It should be appreciated that co-monomers may be used to copolymerize with the α-olefin monomer described above. In a refinement, such co-monomers are included at 1% to about 50% by weight based on the total weight of the final olefin polymer. Suitable co-monomers may include, but are not limited to, olefins, (methyl)acrylates, vinyl, and maleic monomers. Olefin co-monomers may include, but are not limited to, ethylene, propylene, cyclohexene, butylenes, isoprene, chloroprene, butadiene, styrene, and divinylbenzene. (Meth)acrylate co-monomers may include, but are not limited to, methacrylic acid, acrylic acid, methyl methacrylate, ethyl acrylate, acrylonitrile, butyl acrylate, butyl methacrylate, hydroxyethyl acrylate, ethylhexyl acrylate, acrylamide, methacrylamide, hexyl acrylate and lauryl acrylate. Vinyl co-monomers may include, but are not limited to, vinyl acetate, vinyl chloride, vinylidene fluoride, vinylidene chloride, vinyl ethyl ether, vinyl methyl ether, and vinyl pyrrolidone. Maleic co-monomers may include, but are not limited to, maleic anhydride, maleic acid, and maleic esters. Other suitable co-monomers that may also be used.

As set forth above, various embodiments provide a polymerization method that uses a Ziegler-Natta catalyst. Ziegler-Natta catalysts may include, but are not limited to, titanium (III) chloride, titanium(IV) chloride, vanadium chloride, aluminum chloride, methylaluminoxane ($[CH_3AlO]_m$) and organometallic trialkyl aluminum compounds, such as $(CH_3)_6Al_2$, $[Al_1(C_2H_5)_3]_2$ and $[AlCl(C_2H_5)_2]_2$. The Ziegler-Natta catalysts may comprise a mixture of at least two of the metal compounds described above. In a variation, the Ziegler-Natta catalyst comprises a titanium chloride (e.g., titanium tetrachloride, titanium trichloride, etc.) and a dialkyl aluminum. In a refinement of this variation, the Ziegler-Natta catalyst comprises titanium trichloride-aluminum chloride reduced and the dialkyl aluminum is diethyl aluminum. $TiCl_4$ and $[Al(C_2H_5)_3]_2$ may be used together as another catalyst example. In another variation, the Ziegler-Natta catalyst comprises a component selected from the group consisting of metallocenes catalysts and non-metallocene organometallic catalysts. Moreover, both homogeneous and heterogeneous Ziegler-Natta catalysts may be used. Homogeneous Ziegler-Natta catalysts may include, but are not limited to, $(Cp)_2TiCl_2$, and $[Cp_2Zr(CH_3)CH3B(C_6F_5)_3]$ where aluminum co-catalysts may not be needed. Cp as used herein refers to cyclopentadiene herein. Metallocene catalysis polymerization can also be used to produce the olefin polymer. In particular, Kaminsky catalysts and post-metallocene catalysts may be used to polymerize olefin monomers having formula 1 and 3. Examples of metallocene catalysts include, but are not limited to, catalysts represented by the following chemical structures:

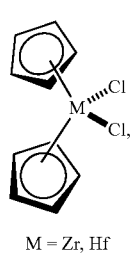

M = Zr, Hf

-continued

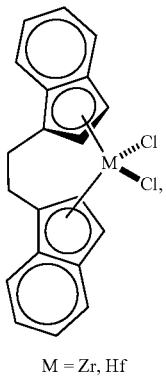

M = Zr, Hf

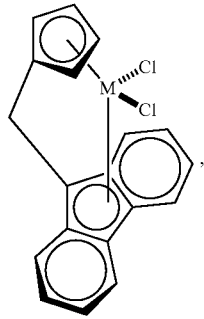

M = Zr, Hf

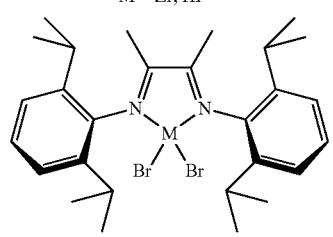

M = Ni, Pd

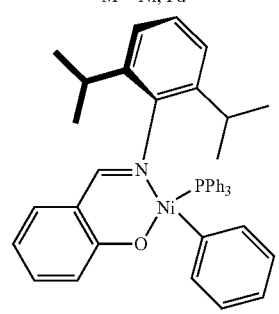

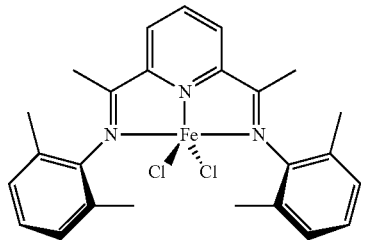

The following examples illustrate the various embodiments of the present invention. Those skilled in the art will recognize many variations that are within the spirit of the present invention and scope of the claims.

EXAMPLE 1

Poly[3,3,4,4,4-pentafluoro-1-butene]

To a 8-fluid ounce beverage bottle stoppered with a red Suba-Seal rubber septum is added toluene (40 mL), 25 wt. % diethylaluminum chloride in toluene (14.4 g), TiCl$_3$.AA (1.8 g, 9.2 mmol, Aldrich), and 3,3,4,4,4-pentafluoro-1-butene (9.5 g, SynQuest). After 16 hours, the contents of the bottle are added to methanol (500 mL) using a Waring blender. The solids are isolated by filtration, washed with water (500 mL), and then washed with methanol (500 mL) using a Waring blender. After filtration and vacuum drying, white, crystalline chunks of poly[3,3,4,4,4-pentafluoro-1-butene] are obtained in 65.3% yield. The polymer, when heated in a differential scanning calorimeter at 10° C. per minute until 200° C. is reached has a glass transition temperature at 10° C., then a recrystallization exotherm at 56.8° C., another recrystallization exotherm at 114.2° C., a first crystalline melt endotherm at 125.3° C., and a second crystallline melt endotherm at 141.2° C. Two recrystallization exotherms occurred on cooling: one at 75° C. (as a sharp exotherm), and another at 59.4° C. (as a broad exotherm). Thermogravimetric analysis was used to show a 1.23 wt. % loss on heating in air up to 200° C. and a 4.62 wt. % loss on heating up to 300° C. The polymer is soluble in hot hexafluorobenzene and is processable by melt extrusion. The high crystallinity of this fluoro-polymer is consistent with the isotactic polymeric structures formed with hydrocarbon 1-olefins polymerized using this catalyst system. It is different from that produced by high energy, free radical radiation. Moreover, the polymerization method described above allows an easy method to make the polymers without a nuclear reactor. This material is useful for hydrophobic coatings and as a seal material for fuel cells. It is also useful as a replacement for fluoropolymers such as poly(vinylidene fluoride) and the like. It should be appreciated that poly[3,3,4,4,4-pentafluoro-1-butene] has reportedly been prepared by the $^{60}$Co irradiation of 3,3,4,4,4-pentafluoro-1-butene by Leo Walls of the National Bureau of Standards). [See D. W. Brown, R. E. Lowry, and L. A. Wall, *Polym. Prepr., American Chem. Soc., Div. Polym. Chem.*, 11, 1042 (1970); ibid, *J. Polym. Sci., Part A*-1, 8, 348 (1970)); ibid, *J. Polym. Sci., Part A*-1, 8, 2441 (1970); D. W. Brown and L. A. Wall, ibid, *Part A*-2, 7, 601 (1969); and ibid, *Part A*-1, 6, 1367 (1968).] The material has been of interest to the Department of Defense (the U.S. Navy and the U.S. Army) and to others because of its interesting surface tension behavior [see W. K. H. Hu and W. A. Zisman, *Macromolecules*, 4 (6), 688 (1971); and M. K. Bernett, *Macromolecules*, 7 (6), 917 (1974)]. There has been one relevant patent relating to this type of materials: L. A. Wall and D. W. Brown, U.S. Pat. No. 3,804,817 (1974). Oddly there was only one claim.

EXAMPLE 2

Poly[3,3,3-trifluoro-1-propene]

The monomer, 3,3,3-trifluoro-1-propene is polymerized using the same procedure as described in Example 1.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   polymerizing a compound having formula 1 with a Ziegler-Natta catalyst to form a polymer having formula 2:

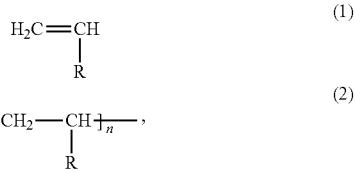

wherein:
   R is $CF_2CF_3$, $(CF_2)_6F$, $C_{12}F_{25}$, $CH_2OCH_2(CF_2)CF_3$, $CH_2OCH_2(CF_2)_4H$, $CH_2OCH_2C_7F_{15}$, $CH_2OCF_2CHFCF_3$, $CH_2C(CF_3)_2O$—$SiMe_3$, $CH_2C_6F_6$, $CH_2OCH_2CF_2CF_2H$, or $CH_2OCF_2CF_2SO_2F$; and
   n is a number from about 20 to 500 on average; and
   incorporating the polymer having formula 2 into a fuel cell component.

2. The method of claim 1 wherein the Ziegler-Natta catalyst comprises titanium chloride and a dialkyl aluminum.

3. The method of claim 2 wherein the Ziegler-Natta catalyst comprises titanium tetrachloride.

4. The method of claim 2 wherein the Ziegler-Natta catalyst is titanium trichloride-aluminum chloride reduced and the dialkyl aluminum is diethyl aluminum.

5. The method of claim 1 wherein the Ziegler-Natta catalyst comprises a component selected from the group consisting of metallocenes catalysts and non-metallocene organometallic catalysts.

6. The method of claim 1 wherein the fuel cell component is an adhesive layer between fuel cells in a fuel cell stack.

7. The method of claim 6 wherein the fuel cell component is a gasket.

8. The method of claim 1 further comprising incorporating the polymer having formula 2 into a gas barrier layer.

9. The method of claim 1 further comprising incorporating the polymer into a piezoelectric device.

10. The method of claim 1 wherein R is a fluorinated ether group or a fluorinated silanol ether.

11. The method of claim 1 wherein R is $CH_2OCH_2(CF_2)CF_3$, $CH_2OCH_2(CF_2)_4H$, $CH_2OCH_2C_7F_{15}$, $CH_2OCF_2CHFCF_3$, $CH_2C(CF_3)_2O$—$SiMe_3$, $CH_2C_6F_6$, $CH_2OCH_2CF_2CF_2H$, or $CH_2OCF_2CF_2SO_2F$.

* * * * *